(12) United States Patent
Pucciani

(10) Patent No.: US 9,592,968 B2
(45) Date of Patent: Mar. 14, 2017

(54) CONVEYING AND ALIGNMENT NOZZLE

(71) Applicant: ILLINOIS TOOL WORKS INC., Glenview, IL (US)

(72) Inventor: Allen S. Pucciani, Beavercreek, OH (US)

(73) Assignee: ILLINOIS TOOL WORKS, INC., Glenview, IL (US)

( * ) Notice: Subject to any disclaimer, the term of this patent is extended or adjusted under 35 U.S.C. 154(b) by 0 days.

(21) Appl. No.: 15/068,699

(22) Filed: Mar. 14, 2016

(65) Prior Publication Data

US 2016/0194161 A1    Jul. 7, 2016

Related U.S. Application Data

(62) Division of application No. 13/481,272, filed on May 25, 2012, now Pat. No. 9,309,060.

(60) Provisional application No. 61/494,760, filed on Jun. 8, 2011.

(51) Int. Cl.
*B65G 47/24* (2006.01)
*B65G 47/14* (2006.01)
*B65G 51/03* (2006.01)

(52) U.S. Cl.
CPC ......... *B65G 47/24* (2013.01); *B65G 47/1407* (2013.01); *B65G 51/03* (2013.01)

(58) Field of Classification Search
CPC ............... B65G 47/1407; B65G 47/24; H01L 21/67787
USPC ...... 198/380; 414/755; 406/75, 87, 192, 194
See application file for complete search history.

(56) References Cited

U.S. PATENT DOCUMENTS

| | | |
|---|---|---|
| 2,645,528 A | 7/1953 | Thorsen |
| 3,034,645 A | 5/1962 | Groppe |
| 3,341,031 A | 9/1967 | Myers |
| 3,750,881 A * | 8/1973 | Husome .................. B07C 5/366 209/546 |
| 3,874,498 A | 4/1975 | Cover |
| 4,284,372 A | 8/1981 | Smith |
| 4,302,134 A * | 11/1981 | Johnson, Jr. ........... B65G 51/02 198/381 |
| 4,813,611 A | 3/1989 | Fontana |
| 4,872,785 A | 10/1989 | Schrage et al. |
| 6,145,650 A | 11/2000 | Christ et al. |
| 6,401,904 B1 | 6/2002 | Risley |
| 6,776,561 B1 | 8/2004 | Yeh |
| 7,080,960 B2 | 7/2006 | Burnett |

(Continued)

FOREIGN PATENT DOCUMENTS

| | | |
|---|---|---|
| AU | 467689 | 12/1975 |
| DE | 4329193 | 3/1995 |
| FR | 1422259 | 12/1965 |

OTHER PUBLICATIONS

European Patent Office, International Search Report, Written Opinion of the International Searching Authority for PCT/US2012/041295 mailed Apr. 9, 2012.

*Primary Examiner* — Joseph Dillon, Jr.
(74) *Attorney, Agent, or Firm* — Klintworth & Rozenblat IP LLC

(57) ABSTRACT

A nozzle system that includes an improved air nozzle is provided. In one embodiment, the nozzle has an inlet and an outlet. An air source is connected with the nozzle through a conduit and generates an air flow using a high flow centrifugal blower. The nozzle is connected with and part of an air-driven orientation device.

7 Claims, 8 Drawing Sheets

(56) References Cited

U.S. PATENT DOCUMENTS

| | | |
|---|---|---|
| 7,973,915 B2 | 7/2011 | Lassig |
| 9,293,895 B2* | 3/2016 | Pucciani .................. H01T 23/00 |
| 2003/0061725 A1* | 4/2003 | Riley .................... F26B 21/004 |
| | | 34/236 |
| 2009/0039178 A1* | 2/2009 | Yoon ........................ B24C 5/04 |
| | | 239/135 |
| 2009/0110813 A1* | 4/2009 | Zimmerman ......... E01C 23/166 |
| | | 427/137 |
| 2009/0211878 A1 | 8/2009 | McDonald |
| 2011/0167871 A1* | 7/2011 | Vehmas ................ C03B 23/035 |
| | | 65/25.2 |
| 2014/0209275 A1* | 7/2014 | Schone ................ F04D 29/541 |
| | | 165/96 |

* cited by examiner

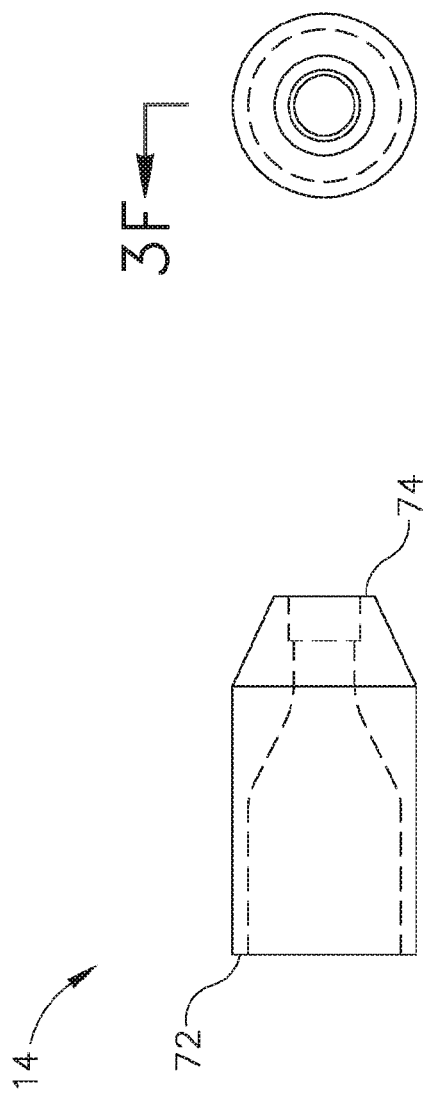
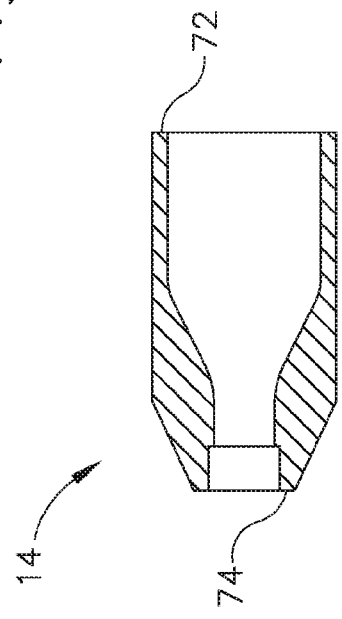

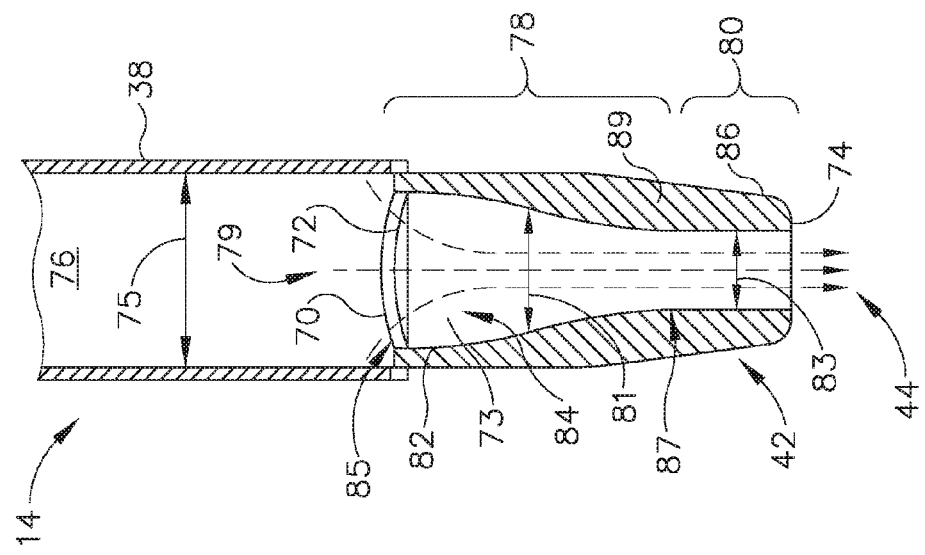
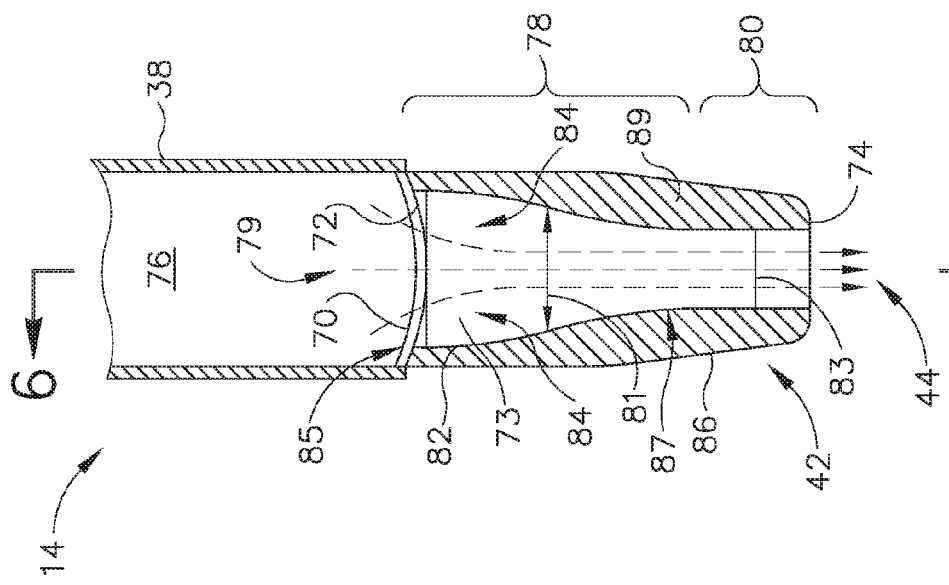

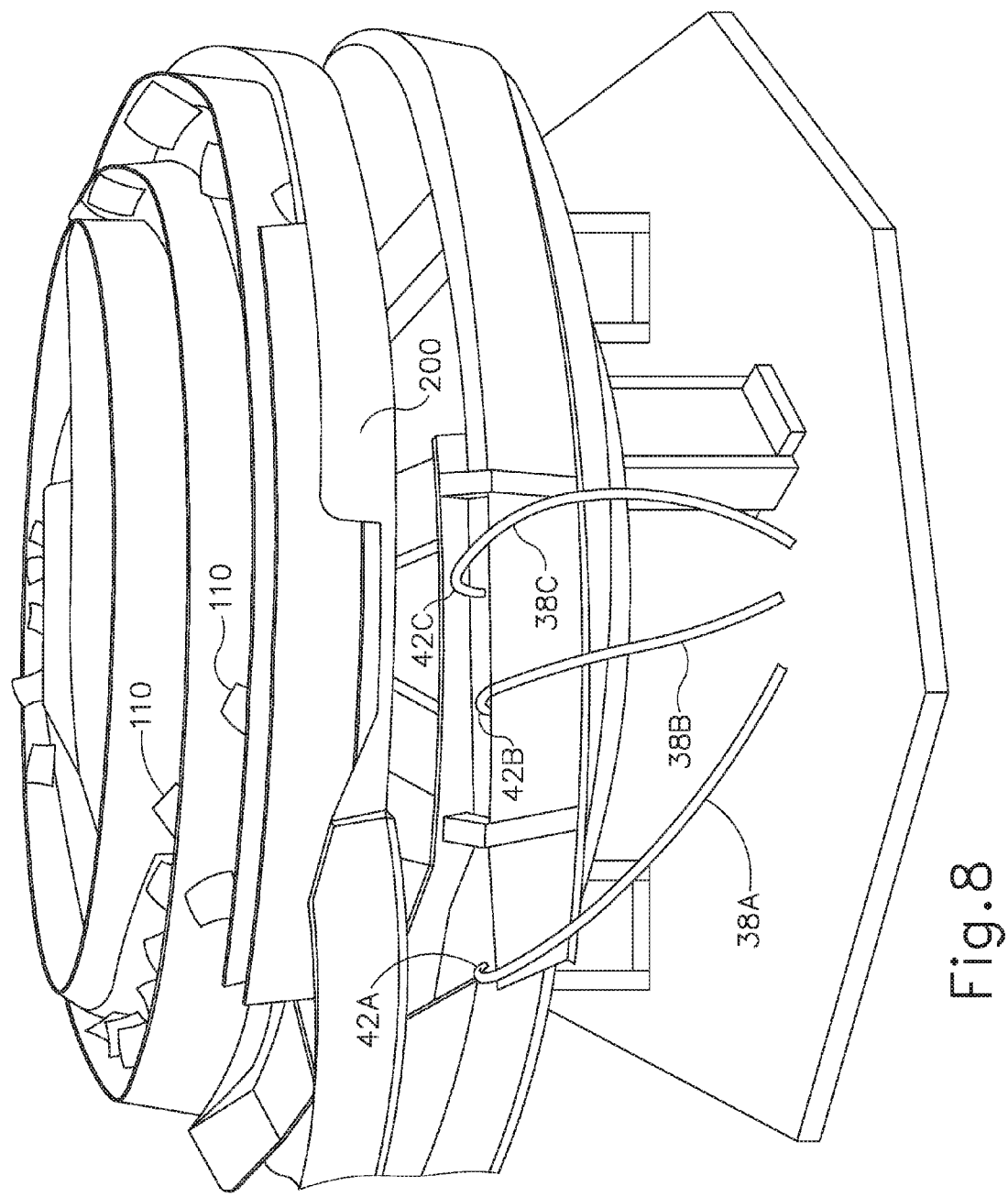

US 9,592,968 B2

CONVEYING AND ALIGNMENT NOZZLE

CROSS REFERENCES TO RELATED APPLICATIONS

The Present application is a divisional of U.S. Non-Provisional patent application Ser. No. 13/481,272, filed May 25, 2012, which claims the benefit of priority from U.S. Provisional Patent Application Ser. No. 61/494,760, entitled "CONVEYING AND ALIGNMENT NOZZLE" and filed on Jun. 8, 2011 with the United States Patent and Trademark Office, the contents of all of which are hereby incorporated by reference in their entirety to the extent permitted by law.

FIELD OF THE INVENTION

The present invention relates generally to processes and devices for fluid discharge. More specifically, it relates to nozzles through which a supply of air is used to convey and align articles.

BACKGROUND

A variety of systems transfer fluids from a fluid supply source to one or more fluid discharge devices. In some systems, an arrangement of fluid conduits, which may include metal pipes, plastic pipes, and/or hoses, may provide a flow path for routing, channeling, or otherwise delivering a fluid from a fluid supply source to a fluid discharge device, such as a nozzle. In the case of a nozzle, air received via an inlet may be pressurized and directed through the nozzle. The output of the nozzle may be utilized for a variety of applications, such as to position, convey or align an article.

SUMMARY

The present invention is defined by the following claims, and nothing in this section should be taken as a limitation on those claims.

In one aspect, an air-driven orientation device is provided. The device includes, but is not limited to an air supply source including a high flow centrifugal blower for generating a low-pressure air flow, a conduit having an inlet coupled with an outlet of the air supply source, and a nozzle. The nozzle has an inlet coupled with an outlet of the conduit. The nozzle comprises a nozzle body having a nozzle inlet, a nozzle outlet, and an annular wall defining a first passage that extends through the nozzle body and which couples the nozzle inlet to the nozzle outlet. The nozzle is capable of receiving the low pressure air flow from the air supply source at a first velocity and outputting an air flow having a second velocity which is 4 to 16 times greater than the first velocity.

In one aspect, method for orienting articles which travel along an assembly path within an air-driven orientation device is provided. The method includes, but is not limited to, generating a low-pressure air flow using a high flow centrifugal blower, transmitting the low-pressure air flow through a conduit and to a nozzle, receiving the low pressure air flow at a first velocity at the nozzle inlet, and generating and outputting an air flow having a second velocity at the nozzle outlet which is 4 to 16 times greater than the first velocity. The nozzle has an inlet coupled with an outlet of the conduit. The nozzle comprises a nozzle body having a nozzle inlet, a nozzle outlet, and an annular wall defining a first passage that extends through the nozzle body and which couples the nozzle inlet to the nozzle outlet.

In one aspect, an air-driven orientation device is provided. The device includes, but is not limited to, an air supply source including a high flow centrifugal blower for generating a low-pressure air flow through an outlet of the air supply source and a nozzle. The nozzle has an inlet coupled with an outlet of the air supply source. The nozzle comprises a nozzle body having a nozzle inlet, a nozzle outlet, and an annular wall defining a first passage that extends through the nozzle body and which couples the nozzle inlet to the nozzle outlet. The nozzle is capable of receiving the low pressure air flow from the air supply source at a first velocity and outputting an air flow having a second velocity which is 4 to 16 times greater than the first velocity.

DRAWINGS

These and other features, aspects, and advantages of the present invention will become better understood when the following detailed description is read with reference to the accompanying drawings in which like characters represent like parts throughout the drawings, wherein:

FIG. 3D is a side view of a nozzle shown in FIG. 3A, in accordance with embodiments of the present disclosure;

FIG. 3E is a front view of the nozzle shown in FIG. 3D, in accordance with embodiments of the present disclosure;

FIG. 3F is a cross sectional view taken along line A-A of the nozzle shown in FIG. 3D, in accordance with embodiments of the present disclosure;

FIG. 5 is a cross-sectional view of the nozzle of FIG. 3A connected with a conduit, showing the flow of air through one of the nozzles;

FIG. 6 is another cross-sectional view of the nozzle of FIG. 3A connected with a conduit, showing the flow of air through one of the nozzles;

FIG. 8 is a perspective view of a fluid-based system that includes one or more nozzles having nozzles, in accordance with embodiments of the present disclosure.

DETAILED DESCRIPTION

Figure 1:
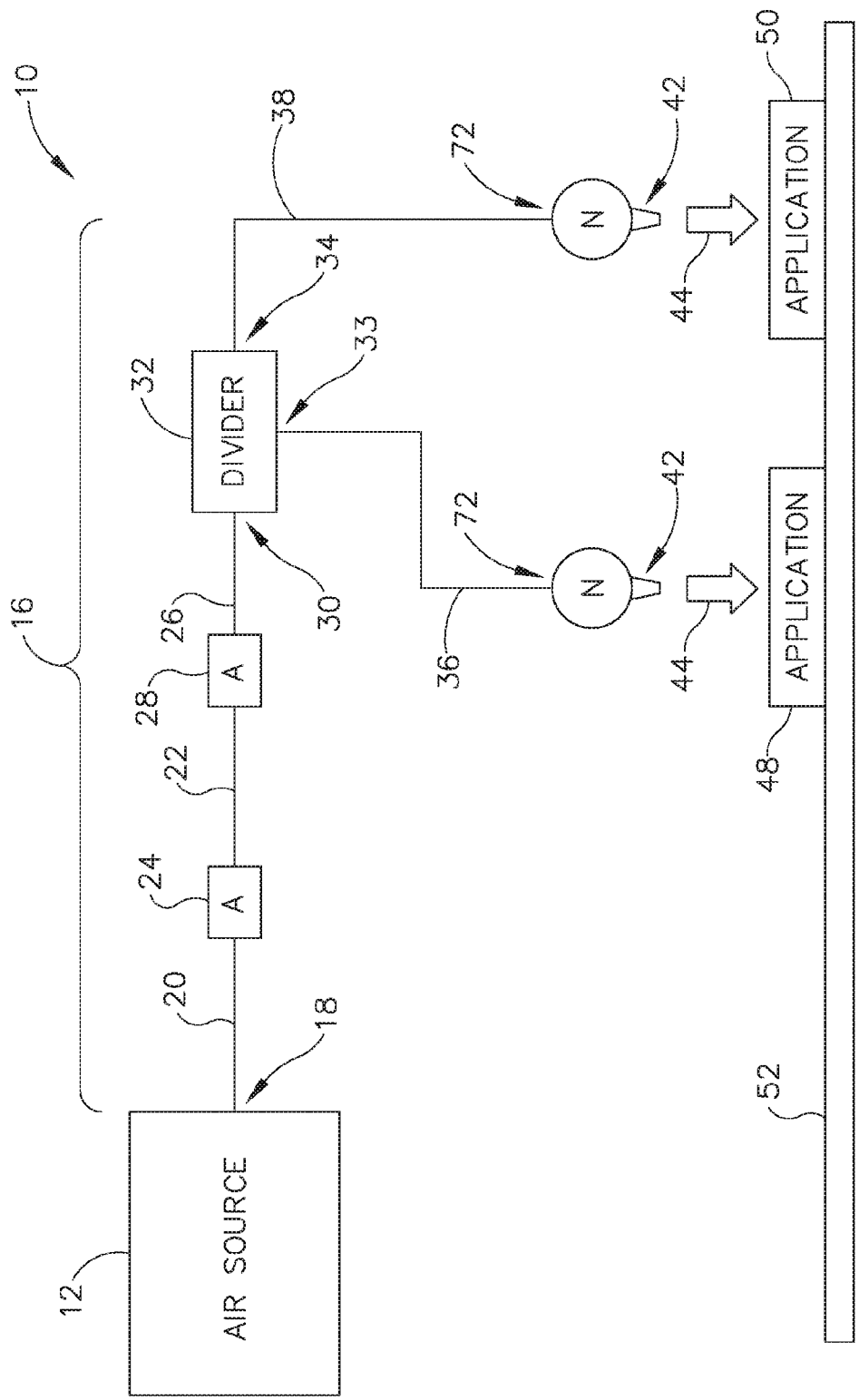
FIG. 1 is a simplified block diagram depicting a fluid-based system that includes one or more nozzles having nozzles, in accordance with embodiments of the present disclosure.

One or more specific embodiments will be described below. These described embodiments are provided only by way of example, and do not limit the scope of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments described below, the articles "a," "an," and "the" are intended to mean that there are one or more of the elements. The terms "comprising," "including," and "having" are intended to be inclusive and mean that there may be additional elements other than the listed elements. Moreover, while the term "exemplary" may be used herein in connection to certain examples of aspects or embodiments of the presently disclosed subject matter, it will be appreciated that these examples are illustrative in nature and that the term "exemplary" is not used herein to denote any preference or requirement with respect to a disclosed aspect or embodiment. Additionally, it should be understood that references to "one embodiment," "an embodiment," "some embodiments," and the like are not intended to be interpreted as excluding the existence of additional embodiments that also incorporate the disclosed features.

As discussed in further detail below, various embodiments of an orientation system that includes improved air nozzles are provided. In one embodiment, a system includes an orientation device that employs a device which generates low pressure air, such as a blower, to a nozzle used to position, convey, or align an article. The nozzle may be aligned with respect to a path formed by the orientation system. The inlet of the nozzle may be shaped to conform to the outer surface of a fluid conduit. This reduces the need for additional fasteners and thus reduces manufacturing and/or assembly time and costs.

The nozzle includes a variable section and a resistive section. The variable section extends from the nozzle inlet to an intermediate transition point along the length of the nozzle, and has a converging inside diameter, which allows for an air flow entering the nozzle from the main body to compensate for flow losses due to cornering as the air flow enters the nozzle inlet. The resistive section extends from the transition point to the nozzle outlet and has a generally constant diameter which is less than the inside diameter of the variable section measured at the nozzle inlet. The resistive section thus resists and controls the flow of the air being discharged from the nozzle outlet. In accordance with aspects of the disclosure, the length of the resistive section is less than the length of the variable section. The foregoing design, which is discussed in detail below, compensates for air flow losses, and thereby improves overall air flow through the nozzle and increases the energy efficiency of the orientation system.

Turning now to the drawings, FIG. 1 illustrates a processing system 10 that may incorporate one or more aspects of the presently disclosed techniques. The processing system 10 includes an air supply source 12 that may deliver a fluid (e.g., air) to nozzles 42 along a flow path 16. In the illustrated embodiment, the flow path 16 includes the fluid conduits 20, 22, 26, 36, and 38, the adapters 24 and 28, and the divider 32.

In the presently illustrated system 10, the air supply source 12 may include a high flow centrifugal blower ("air blower"), such as a Paxton™ Model XT300 Blower (Part Number 8006100) having 3 Hp and operating at 60 Hz, 230V/460V/3/60 Hz at 160 CFm at 40" w/c (pressure) and a Paxton™ Enclosure, (Part Number 8006300), all manufactured by ITW Air Management of Cincinnati, Ohio. In some embodiments, the air supply source 12 may include a supercharger and motor configuration. In one embodiment, the operating characteristics of the air blower 12 may provide a low-pressure air flow having a pressure of between approximately 1-10 pounds per square inch (psi) and having a flow rate of between approximately 50-2000 cubic feet per minute (CFM) or more specifically, between approximately 150 to 1500 CFM. In some embodiments, the air blower 12 may be housed within an enclosure. The air blower 12 may be separated from the nozzles 42 by a distance of 10, 20, 30, 40, 50, 100, or 200 feet or more. As such, the flow path 16 is configured to provide a path through which air provided by the air blower 12 may be routed and ultimately delivered to the nozzles 42.

The air blower 12 may include an outlet 18 coupled to the fluid conduit 20 that defines a first portion of the flow path 16. The fluid conduit 20 may be coupled to the downstream fluid conduit 22 by way of a first adapter 24. By way of example only, the fluid conduit 20 may be a hose, such as a flexible hose, and the fluid conduit 22 may be a pipe, such as a stainless steel pipe or a polyvinyl chloride (PVC) pipe. The adapter 24 may be configured to provide an interface for coupling the hose 20 and pipe 22. For instance, the adapter 24 may include a first adapter end configured to couple to the hose 20, and a second adapter end configured to couple to the pipe 22. In this manner, the hose 20, adapter 24, and pipe 22 are fluidly coupled, thereby allowing air discharged from the outlet 18 of the blower 12 to flow from the hose 20 into the pipe 22.

The flow path 16 continues to the distal end of the pipe 22, which may be coupled to another hose 26 by way of a second adapter 28 that may be similar in design to the first adapter 24. Thus, by way of the adapters 24 and 28, the air flow from the blower 12 may be received by an inlet 30 of a flow divider 32. The flow divider 32 may be configured to distribute or split the air flow to multiple outlets 33 and 34. In one embodiment, the flow divider 32 is a Paxton™ Model 8005502-3-3 Divider manufactured by ITW Air Management of Cincinnati, Ohio. In one embodiment, the fluid conduits 20, 22, and 26 are a polyvinyl chloride (PVC) pipe having a diameter from 50 mm to 102 mm and preferably of about 77 mm, and the fluid conduits 36 and 38 are a polyvinyl chloride (PVC) pipe having a diameter from 25 mm to 77 mm and preferably of about 50 mm.

Additional fluid conduits 36 and 38 may respectively couple the outlets 33 and 34 to the nozzles 42, respectively. In the illustrated embodiment, the nozzles 42 may each include an inlet (72A and 72B) configured for a hose connection and the fluid conduits 36 and 38 may thus be provided as hoses, such as flexible hoses. In other embodiments, a pipe may be disposed between the divider 32 and one of the nozzles 42, whereby adapters similar to the above-discussed adapters 24 or 28 are coupled to each end of the pipe to facilitate a fluid connection between hoses extending from an outlet (e.g., 33 or 34) of the divider 32 and from an inlet (e.g., 72A or 72B) of one of the nozzles (e.g., 42). In some embodiments, the system 10 may include only a single nozzle (e.g., 42) and thus may not include a divider 32. In such embodiments, the fluid conduit 26 may be coupled directly to the nozzle 42.

As will be discussed further below, the nozzle 42 may include a main body or housing that defines a plenum or fluid cavity for receiving an air flow via the inlet 72. In certain embodiments, the nozzle 42 may be formed of materials including aluminum, stainless steel, plastic or composite materials, or some combination thereof. In some embodiments, the main body may be generally cylindrical in shape and may include one or more openings which provide a path for air to flow into respective nozzles 42 coupled to the main body of the nozzle.

In operation, the fluid cavity defined by the main body of the nozzle 42 may pressurize and discharge air received via the inlet 72 through the nozzle(s) 42, as indicated by the output air flow 44. Accordingly, the air flow 44 exiting the nozzle(s) 42 may have a velocity that is greater than the velocity of the air flow entering via the inlet 72. While only two outlets 33 and 34 are shown in FIG. 1, it should be appreciated that the flow divider 32 may be configured to provide any suitable number of outlets, and may provide flow paths to any suitable number of devices, such as additional nozzles, air knives, flow dividers, and so forth. As will be discussed further below, the nozzle 42, as designed in accordance with embodiments of the present disclosure, may provide for improved air flow by reducing losses due to cornering as air flows over sharp corners, such as the interface between the main body or housing of the nozzle 42 and the inlet of the nozzle 42.

As shown in FIG. 1, the air flows 44 exiting the respective nozzles 42 of each of the nozzles 42 may be directed towards the applications 48 and 50, respectively, of the processing system 10. For instance, the applications 48 and 50 may be transported through the system 10 along a conveyor belt 52 or some other suitable type of transport mechanism. As will be appreciated, the application represented by the system 10 may utilize the air flows 44 provided by the nozzles 42, respectively, for a variety of functions, including but not limited to drying products, removing dust or debris, coating control, cooling, leak detection, surface impregnation, corrosion prevention, and so forth. For instance, in certain embodiments, the system 10 may be a system for drying food or beverage containers, such as cans or bottles, or may be a system for removing dust and other debris from sensitive electronic products, such as printed circuit boards (PCBs) or the like. In addition, some embodiments of the system 10 may also utilize the air flows 44 to clean and/or remove debris from the conveyer belt 52.

Figure 2:
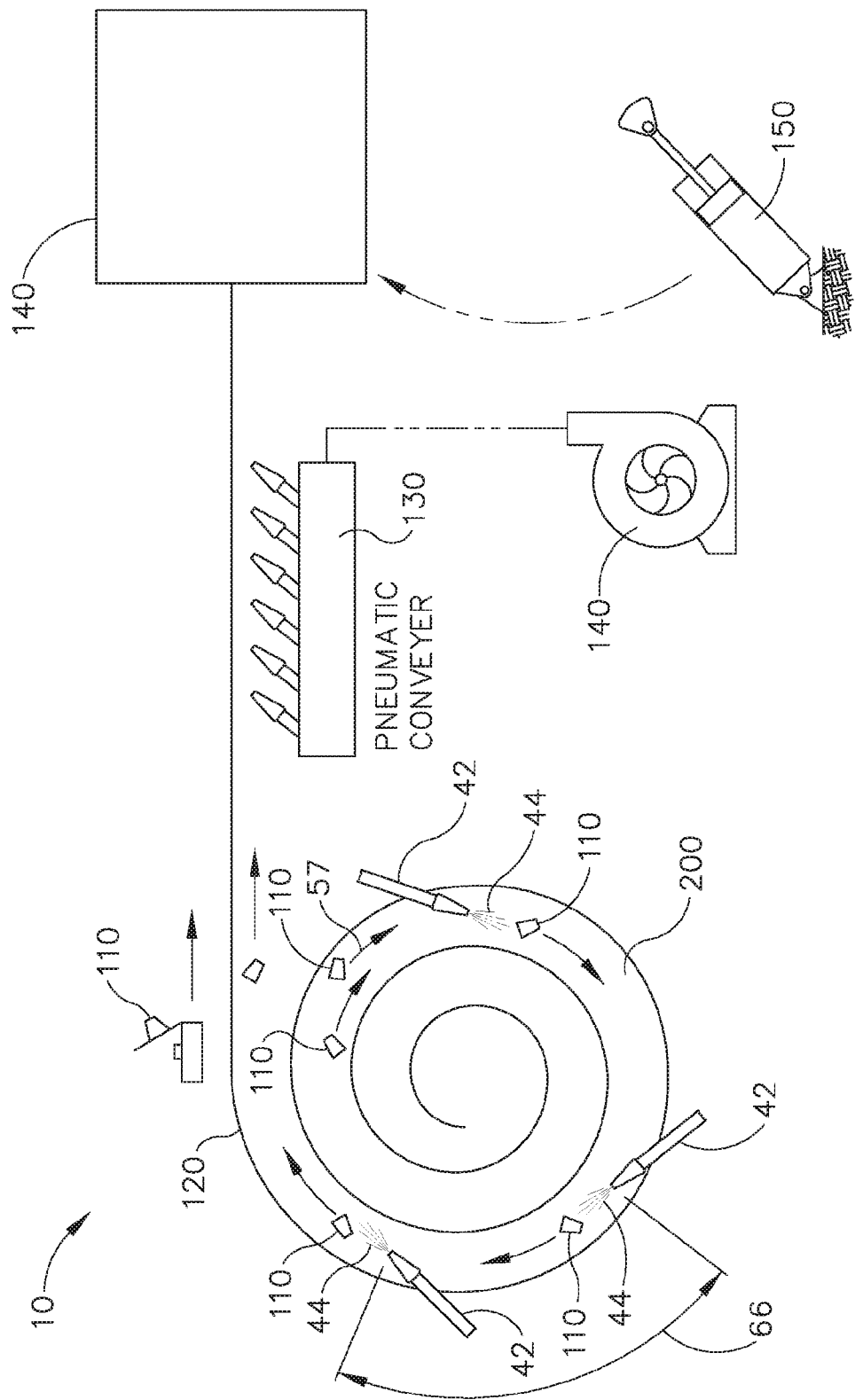
FIG. 2 is a simplified block diagram depicting a fluid-based system that includes one or more nozzles having nozzles, in accordance with embodiments of the present disclosure.
Figure 9:
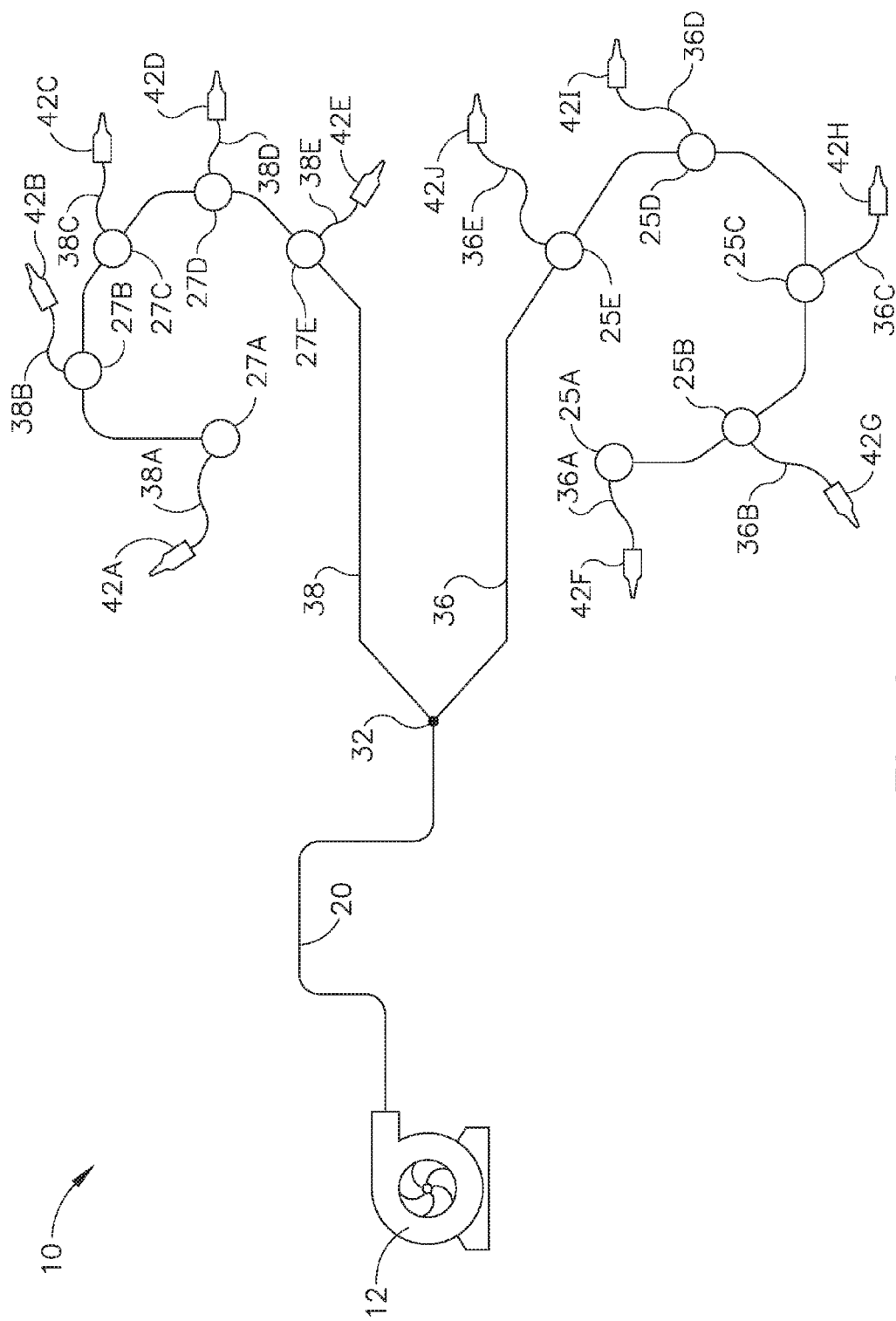
FIG. 9 is a simplified block diagram depicting a fluid-based system that includes one or more nozzles having nozzles, in accordance with embodiments of the present disclosure.

With reference to FIGS. 2 and 9, in one embodiment, the system 10 utilizes the air flows 44 to position, convey, or align articles 110 within an air-driven orientation device 200. An air-driven orientation device 200 is any device capable of orientating an article 110 using an air flow 44, such as a vibratory bowl, a feeder, a sorter, an assembly line, a conveyor belt, or an orientator. Articles 110 includes any type of device which is manufactured, which makes up an item, and which needs to be aligned during assembly or manufacture of the item. Articles 110 are preferably light enough to be orientated using a puff of air, such as plastic articles like bottle caps or lids which need to be orientated before being mated with a bottle. The oriented articles 110 follow an assembly path 57 down through the orientation device 200 to a conveyor line 120. Oriented articles 110 are driven down the conveyor line using a pneumatic conveyor 130 which is driven by an air source 130, such as a high flow centrifugal blower ("air blower"). The oriented articles 110 then enter a machine 140, which relies on the corrected orientation of the articles 110 to perform a task, such as to connect the articles 110 with another part to form an item. For example, if the articles are bottle caps, the machine 140 may connect the bottle caps with a bottle to form a sealed bottle. The machine 140 may include devices, such as a pneumatic cylinder 150, to perform a task.

As shown, the system 10 may include a number of nozzles 42A-42F positioned strategically about the orientation device 200 in order to orient articles 110 which travel along an assembly path 57 within the orientation device 200. As will be discussed below with respect to FIG. 9, the conduits 36 and 38 may be connected with a number of additional fluid conduits 36A-E and 38A-E, each of which corresponds to a respective one of the nozzles 42A-42J. The inlet ends of the nozzles 42A-42J may be connected with or welded to each respective fluid conduit 36A-E and 38A-E via TIG welding, as mentioned above, or via any other suitable type of welding technique. In particular, the inlet ends of the nozzles 42A-42J may be welded to the outlets of each fluid conduit 36A-E and 38A-E. Additionally, each fluid conduit 36A-E may be coupled with fluid conduit 36 via adapters 25A-E, respectively, and each fluid conduit 38A-E may be coupled with fluid conduit 38 via adapters 27A-E, respectively.

While the depicted embodiment of FIG. 9 shows ten nozzles (42A-42J), it should be appreciated that various embodiments may provide any suitable number of nozzles. For instance, certain embodiments may include 2 to 20 nozzles or more. The nozzles 42A-42J may be spaced apart along the assembly path 57 of the system 10, such that each nozzle 42A-42J is separated by a distance 66 along the assembly path 57. The distance 66, in some embodiments may be between approximately 1 to 12 inches (e.g., 1, 1.5, 2, 2.5, 3, 3.5, 4, 4.5, 5, 5.5, 6, 7, 8, 9, 10, 11, or 12 inches). In other embodiments, the distance 66 may be determined as a percentage of the total length of the path 57. By way of example, in certain embodiments, the distance 66 may be between approximately 10 to 30 percent or, more specifically, between approximately 15 to 25 percent of the length of the path 57. In further embodiments, the distance 66 may be different between each nozzle 42A-42F. For instance, in one embodiment, the distance 66 may progressively increase or decrease from one end of the path 57 to another end of the path 57.

Figure 4:
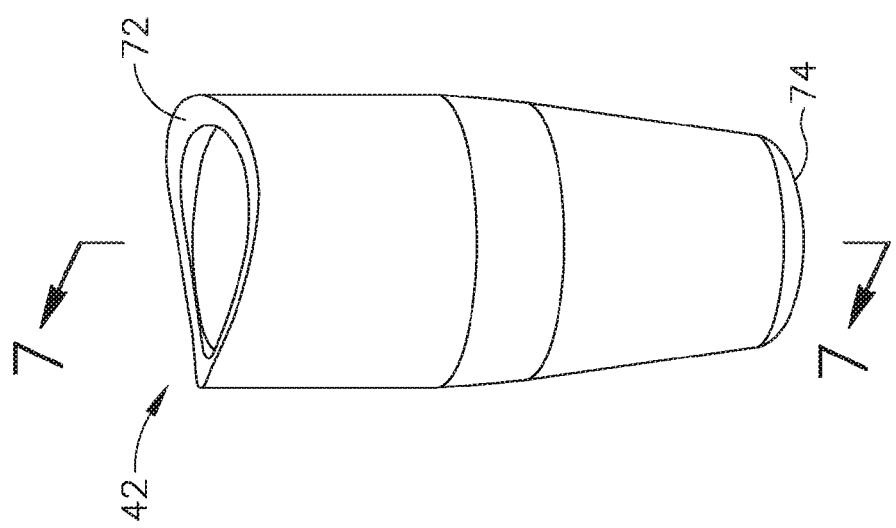
FIG. 4 is a more detailed view of the embodiment of the nozzle shown in FIG. 3A, in accordance with embodiments of the present disclosure.

As discussed with reference to FIG. 9, each of the nozzles 42A-42J may have an inlet end and an outlet end. For instance, as shown in FIG. 4, the nozzle 42 has an inlet 72 and an outlet 74. FIG. 4 depicts an enlarged view of an embodiment of the nozzle 42. As shown in the illustrated embodiment, the inlet 72 of the nozzle 42 may be formed or shaped to include a radius, such that the inlet 72 conforms to the outer surface of the generally cylindrical conduit 38 to which the nozzle 42 is joined. That is, the shape of the inlet 72 conforms or fits flush against an outer surface of the conduit 38. As will be appreciated, this improves the ease of welding the nozzle 42 to the conduit 38 of the nozzle 42, and thereby reduces manufacturing time and costs. In other embodiments, the nozzle 42 may be joined to a main body having an opening formed on a flat surface and, therefore, may not include the radius cut on the inlet 72.

FIGS. 5 and 6 show cross-sectional views of the nozzle 42. FIGS. 5 and 6 will generally be discussed together below. Particularly, FIGS. 5 and 6 depict the flow of air 79 from the conduit 38 through a nozzle 42. In the depicted cross-sectional views, the inlet 72 of the nozzle 42 is joined to the opening 70 to define a path by which air 79 flowing into a cavity 76 (via inlet 40) defined by the conduit 38 is discharged from the nozzle 42 through the outlet 74 of the nozzle 42 as the output air flow 44 (FIG. 1). That is, the nozzle 42 includes a main body 89 having a passage 73 extending therethrough, which is generally cylindrical in shape, but with a width or diameter that varies in accordance with the changes in the inside diameter of an inside wall 82, as will be discussed further below.

As will be appreciated, air flow naturally forms a radius or void when flowing around sharp corners. This effect, which may be referred to as cornering, may result in losses in pressure and/or throughput as the air flows through certain nozzles. To compensate for such cornering effects, the depicted nozzle 42 may include a first section 78 and a second section 80. The first section 78, which may be referred to as a variable section, has a variable or changing inside diameter (ID), represented by reference number 81. That is, the portion of the inside wall 82 that is part of the variable section 78 may converge, such that the ID 81 decreases as the inside wall 82 transitions away from the inlet 72. The second section 80, which may be referred to as a resistive section, has a generally constant ID, represented here by reference number 83, which is generally less than the ID 81 at the inlet 72 of the nozzle 42. Thus, in the depicted embodiment, the inside wall 82 may gradually converge, such that the ID 81 gradually decreases beginning from the inlet 72 along the length of the variable section 78 (e.g., moving towards the outlet 74). At the point along the inside wall 82 where the ID 81 is approximately equal to the ID 83, referred to here by reference number 87 (e.g., a transition point), the resistive section 80 begins and extends for the remainder of the length of the nozzle 42, terminating at the nozzle outlet 74. The dimensions of the nozzle 42 will be discussed below in more detail with respect to FIG. 7. As will also be discussed below, the section 80 is referred to as a resistive section because it is configured to control or restrict the air flow 79 after cornering effects have been overcome or mitigated in the variable section 78.

By providing an entrance (e.g., inlet 72) having an ID that is greater in diameter than the outlet ID (e.g., 83), the air flow 79 may stabilize prior to reaching the resistive section 80. For instance, as shown in FIGS. 5 and 6, the air flow 79 entering the nozzle 42 flows over corners 85 formed at the interface between the opening 70 and the inlet 72. However, due to cornering, the air flow 79 initially does not flow directly along or against (e.g., in contact with) the inside wall 82 of the nozzle upon entering from the inlet 72, as indicated by the annular space 84. That is, the space 84 is considered to be annular due to the effects of cornering, such that the air flow 79 generally does not initially enter or flow through the annular space 84. As the air flow 79 continues downstream towards the outlet 74, the annular space 84 gradually decreases due to the convergence of the inside wall 82 in the variable section 78 of the nozzle 42. This allows for the air flow 79 to overcome cornering effects that occur during the initial transition from the cavity 76 into the inlet 72 of the nozzle 42.

Because the nozzle 42 includes the variable section 78 that compensates for the effects of cornering, control of the output air flow 44 is provided by the resistive section 80. That is, as the air flow 79 reaches the transition point 87 between the variable section 78 and the resistive section 80, the annular space 84 is substantially reduces or, in some instances, terminated, such that the output air flow 44 is controlled or constricted by the ID 83 of the resistive section 80 and thus by the outlet 74 of the nozzle, as opposed to being limited due to cornering at the inlet 72.

FIGS. 3D, 3E, 3F, and 7 depict various views of an embodiment of the nozzle 42 and illustrate the dimensions of the nozzle 42 in more detail. As shown, the nozzle may have an overall length 88. The inlet 72 of the nozzle may have an outer diameter (OD) 90 and an inside diameter (ID) 92. Thus, the variable ID 81 of the variable section 78 is equal to the inlet ID 92 when measured at the inlet 72. In certain embodiments, the ID 92 may be approximately equal to the diameter 75 of the corresponding conduit 38 connected with the nozzle 42. By way of example, in certain embodiments, the inlet ID 92 and the diameter 75 of the conduit 38 may both be between approximately 0.5 to 2.5 inches (e.g., 0.5, 0.75, 1, 1.25, 1.5, 1.75, 2 or 2.5 inches). The inlet OD 90 may be sized such that it is between approximately 20 to 50 percent greater than the inlet ID 92. For instance, in an embodiment where the inlet ID 92 and the opening 70 are each approximately 1 inch, the inlet OD 90 may be between approximately 1.2 to 1.5 inches.

As the ID 81 of the variable section 78 transitions from the inlet 72 to the transition point 87 (e.g., where the resistive section 80 begins), the ID 81 may decrease by between approximately 40 to 60 percent or, in some embodiments, between approximately 45 to 55 percent relative to the inlet ID 92. The ID 83 of the resistive section 80 may thus be approximately equal to the ID 81 of the variable section 78 when measured at the transition point 87. Accordingly, the ID 83 of the resistive section 80 may be between approximately 40 to 60 percent or, in some embodiments, between approximately 45 to 55 percent the length of the ID 92. By way of example only, in the above-mentioned embodiment where the ID 92 is approximately 1 inch, the ID 83 of the resistive section 80 may be between approximately 0.4 to 0.6 inches or, more specifically, between approximately 0.45 to 0.55 inches, or even more specifically, approximately 0.5 inches. In embodiments, the relationship between the inlet 72 and the outlet 74 may also be expressed in terms of surface area of their respective openings. For instance, in one embodiment, the area of the outlet opening 74 may be between approximately 15 to 40 percent or, more specifically, between approximately 20 to 35 percent the area of the inlet opening 72.

As further shown, the variable section 78 may have a length 94, and the resistive section 80 may have a length 96. In the depicted embodiment, the length 94 of the variable section 78 is greater than the length 96 of the resistive section 80. In other words, the distance along which the ID 81 converges is greater than the distance along which the ID 83 remains generally constant. By way of example only, the length 96 of the resistive section 80, in one embodiment, may be between approximately 25 to 45 percent (e.g., 25, 30, 35, 40, or 45 percent) or, more specifically, between approximately 30 to 35 percent of the total length 88 of the nozzle 42. Accordingly, the length 94 of the variable section 78 may be expressed as the difference between the total length 88 of the nozzle 42 and the length 96 of the resistive section 80. For instance, based on the percentages provided above, the length 94 of the variable section 78 may be between approximately 75 to 55 percent or, more specifically, between approximately 70 to 65 percent the total length 88 of the nozzle 42. By way of example only, in certain embodiments, the length 88 of the nozzle may be between approximately 2 to 4 inches, and the length 96 of the resistive section 80 may be between approximately 0.625 to 1.8 inches. In one particular embodiment, the nozzle 42 may have an overall length 88 of approximately 2.5 inches with a resistive section 80 having a length 96 of approximately 0.75 inches and a variable section 78 having a length 94 of approximately 1.75 inches.

Figure 7:
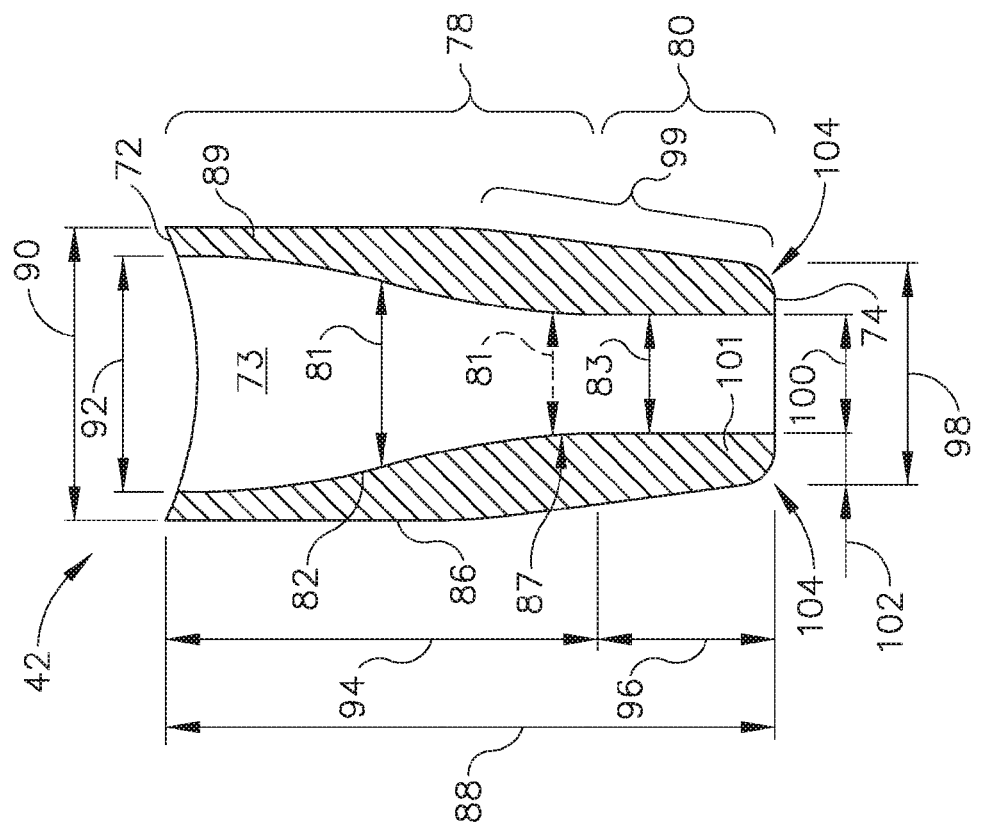
FIG. 7 is an enlarged cross-sectional view of an embodiment of the nozzle taken along cut-line 7-7 of FIG. 4.

As discussed above, the resistive section 80 has a generally constant ID 83 along its length 96. Thus, the ID 100 of the outlet 74 is approximately equal to the ID 83 of the resistive section 80. In the depicted embodiment, the outside wall 86 may include a taper 99 extending towards the outlet 74 of the nozzle 42, as shown in FIG. 7. As shown, this may result in the OD 98 at the outlet 74 being less than the OD 90 of the inlet 72. By way of example only, in such an embodiment, the outlet OD 98 may be between approximately 60 to 80 percent (e.g., 60, 65, 70, 75, or 80 percent) of the inlet OD 90. Further, in some embodiments, the nozzle 42 may not include the taper 99, and thus the outlet OD 98 may be approximately equal to the inlet OD 90.

The tip at the outlet 74 of the nozzle may include an annular wall 101 (e.g., material between the inner wall 82 and the outer wall 86). The thickness of the annular wall 101 at the outlet 74 is represented by the reference number 102. In certain embodiments, the thickness 102 may be between approximately 20 to 75 percent or, more specifically, between approximately 20 to 50 percent of the outlet ID 100. By way of example only, in one particular embodiment, the ID 92 may be approximately 1.25 inches, the ID 100 may be approximately 0.5 inches, and the thickness 102 may be between approximately 0.125 to 0.25 inches. The thickness 102, when compared to certain nozzles, allows for the nozzle 42 to be more rugged and durable against impacts that may occur in an industrial setting, such as in the process system 10 of FIG. 1. This may prolong the operational life of the nozzles 42 and thus the nozzle 42. Further, in the depicted embodiment, the outermost edge of the outlet 74 that meets the outside wall 86 may include a chamfer 104. In certain embodiments, the degree of the chamfer 104 may be between approximately 30 to 60 degrees, between approximately 40 to 50 degrees, or between approximately 42 to 48 degrees.

As mentioned above, in certain embodiments, the nozzle 42 may be formed from stainless steel, such as a piece of solid stainless steel bar stock. For instance, the nozzle 42 may be manufactured by machining and/or lathing the stainless steel bar stock. The resulting nozzle 42 may be welded (e.g., by TIG welding) about an opening 70 on the conduit 38 of the nozzle 42 to form a flow path through which air may be discharged (e.g., as air output 44). Because the inlet 72 may include a radius cut (e.g., as shown in FIG. 4), the inlet 72 of the nozzle 42 may conform against the outer surface of the conduit 38, which simplifies the welding process and thus reduces overall manufacturing time and cost. Further, because the nozzle 42 is welded to the conduit 38, the need for additional fasteners and the like is reduced. Additionally, weld joints generally lack crevices in which bacterial growth may occur, which is ideal and beneficial for food and/or beverage applications.

Figure 3B:
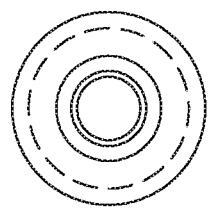
FIG. 3B is a front view of a nozzle which may be used in connection with the system shown in FIGS. 1 and 2, connected with an elongated cylindrical shaft, in accordance with embodiments of the present disclosure.
Figure 3A:
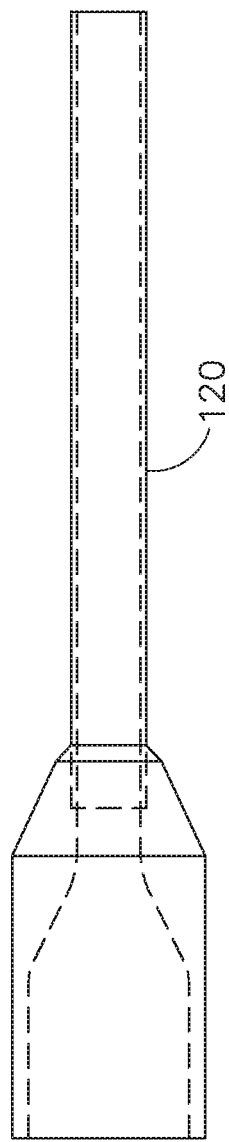
FIG. 3A is a side view of a nozzle which may be used in connection with the system shown in FIGS. 1 and 2, connected with an elongated cylindrical shaft, in accordance with embodiments of the present disclosure.
Figure 3C:
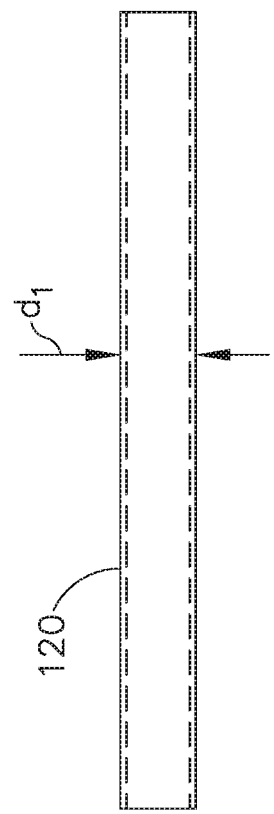
FIG. 3C is a side view of the elongated cylindrical shaft which is to be connected with the nozzle shown in FIG. 3A, in accordance with embodiments of the present disclosure.

With reference to FIGS. 3A, 3B, and 3C, the nozzle 42 may have an elongated cylindrical shaft 120 having a constant diameter $d_1$ connected with the outlet 74 of the nozzle 42. The elongated cylindrical shaft 120 does not further compress the air flow through the nozzle 42, but rather maintains the pressure of the air flow 44 at a relative constant. The elongated cylindrical shaft 120 is used to guide the air flow 44 to an article 110 in order to orientate the article 110. Air flow 44 leaving the nozzle 42 and the elongated cylindrical shaft 120 is preferably capable of pushing articles 110 with between 0.75 and 1.50 Newtons of force, and more preferably of about 1.10, ±0.25 Newtons of force. The by varying the sizes of the ID 81 and the ID 83, the nozzle 42 is capable of receiving a low pressure air flow 44 from the air supply source 12 at a first velocity and outputting an air flow having a second velocity which is 4 to 16 times greater than the first velocity.

Preferably, the air supply source 12 may include a high flow centrifugal blower ("air blower"). By using a high flow centrifugal blower, air source 12 is capable of generating an air flow 44 leaving the nozzle 42 having the same amount of force as a compressor based air source, yet using as much as 80% less energy. This results in an orientation device 200 which his much more energy efficient than traditional orientation devices.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for orienting articles which travel along an assembly path within an air-driven orientation device, the method comprising:
generating a low-pressure air flow using a high flow centrifugal blower of the air-driven orientation device;
transmitting the low-pressure air flow through a conduit and to a nozzle, wherein the nozzle has a nozzle inlet coupled with an outlet of the conduit, wherein the nozzle comprises a nozzle body having the nozzle inlet, a nozzle outlet, and an annular wall defining a first passage that extends through the nozzle body and which couples the nozzle inlet to the nozzle outlet;
receiving the low pressure air flow at a first velocity at the nozzle inlet; and
generating and outputting an air flow having a second velocity at the nozzle outlet which is 4 to 16 times greater than the first velocity, wherein the air flow having the second velocity is configured to orient articles.

2. The method of claim 1 further comprising directing the air flow at articles which travel along an assembly path within the air-driven orientation device in order to orient the articles.

3. The method of claim 1, wherein the low-pressure air flow has a pressure of between approximately 1-10 pounds per square inch (psi) and a flow rate of between approximately 50-2000 cubic feet per minute (CFM).

4. The method of claim 1, wherein the air flow output by the nozzle is used to position, convey, or align articles within the air-driven orientation device.

5. The method of claim 1, further comprising strategically positioning multiple nozzles each about the orientation device in order to orient articles which travel along an assembly path within the air-driven orientation device.

6. The method of claim 1, wherein the nozzle includes an inside wall having a first section and a second section, wherein the first section has a variable or changing first inside diameter (ID), wherein the portion of the inside wall that is part of the first section converges such that the first ID decreases as the inside wall transitions away from the inlet, wherein the second section has a generally constant second ID which is generally less than the first ID at the inlet of the nozzle.

7. The method of claim 6, wherein in the first section the inside wall gradually converges such that the first ID gradually decreases beginning from the inlet along the length of the first section and moving towards the outlet, and wherein a transition point occurs at a point along the inside wall where the first ID is approximately equal to the second ID, and wherein the second section begins at the transition point and extends for the remainder of the length of the nozzle, terminating at the nozzle outlet.

* * * * *